UNITED STATES PATENT OFFICE.

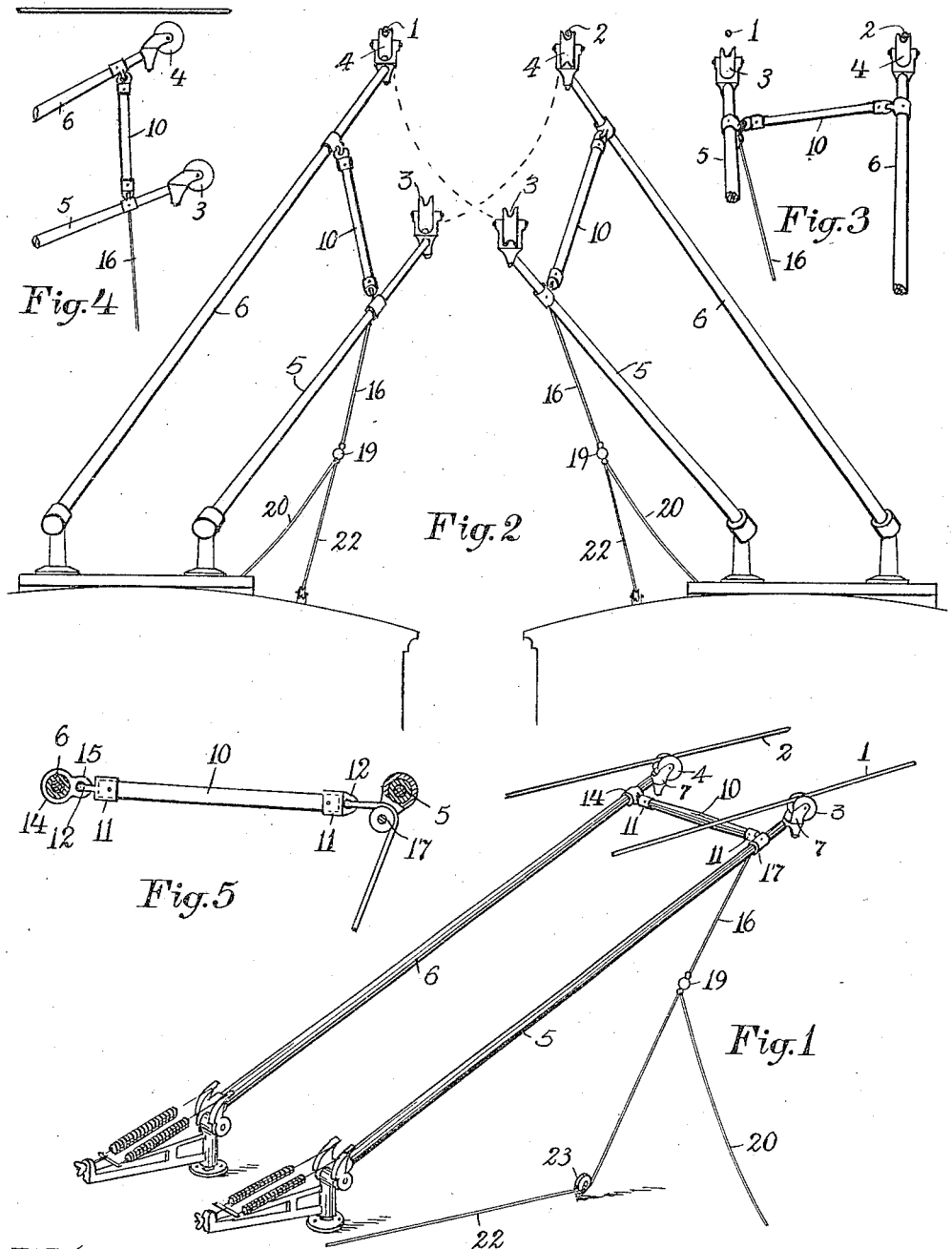

ARTEMAS B. UPHAM, OF MALDEN, MASSACHUSETTS, ASSIGNOR, BY MESNE ASSIGNMENTS, TO EDWIN SHIVELL, OF MELROSE, MASSACHUSETTS.

TROLLEY.

1,294,204.      Specification of Letters Patent.      Patented Feb. 11, 1919.

Application filed March 31, 1915, Serial No. 18,290. Renewed May 2, 1918. Serial No. 232,959.

*To all whom it may concern:*

Be it known that I, ARTEMAS B. UPHAM, a citizen of the United States, and a resident of the city of Malden, in the county of Middlesex and Commonwealth of Massachusetts, have invented certain new and useful Improvements in Trolleys, of which the following is a full, clear, and exact specification.

This invention relates to that class of trolley systems wherein each car is provided with two trolleys simultaneously engaging two trolley wires, and is especially adapted to cars which do not run upon track rails but are known as trackless trolley cars.

One objection found to exist in connection with all such two-wire trolley systems is the greatly added cost for the two additional trolley wires when the traffic is such that cars passing each other are subjected to the delay and bother of frequent removal and replacement of their trolleys. Not alone is the expense a heavy burden to the stockholders of the line, but the number of trolley wires overhead in the streets is often objected to by the residents.

My invention has for its object the enabling of cars to pass each other in opposite directions in a system employing but two trolley wires, and yet entirely without delay or bother. To this end I have devised means whereby each car can keep one of its trolley wheels in contact with one of the wires, while each other trolley wheel is swung far enough away from its wire to avoid the similarly removed trolley of the other car, and whereby each removed trolley is automatically controlled in its return to its former wire by its unremoved trolley. In carrying my invention into effect I finally discovered, after making several quite complicated devices for the purpose, that a simple bar of some non-conducting material loosely attached at its ends to the two trolley poles of a car, would enable a withdrawn trolley to swing accurately back into engagement with its wire.

Referring to the drawings forming part of this specification, Figure 1 is a perspective view of a double trolley embodying my improvements. Fig. 2 is an end view of two trolley wires showing two trolley cars in the act of passing each other, with one trolley of each car withdrawn. Fig. 3 shows two trolley wheels and portions of their trolley poles, one of which is partially away from its trolley wire. Fig. 4 shows two trolleys entirely withdrawn from their wires. Fig. 5 is a detail view of the connecting bar, showing the trolley poles in cross section.

The reference numerals 1, 2 designate the two trolley wires of a two-wire system; 3 and 4 are the trolley wheels, and 5 and 6 are the trolley poles adapted to press the said wheels up into engagement with the wires. For cars designed to run on track-rails, the trolley harps 7 may be of any well known type, but for trackless trolleys the trolley harps must be swiveled to permit the lateral deflection of the cars.

The non-conducting bar 10 is preferably composed of wood suitably varnished or otherwise treated to render it impervious to moisture and consequently incapable of short-circuiting the current from wire to wire. At each end of this bar and strongly fastened thereon, is a thimble 11 formed with an eye 12. The thimble at one end of the bar is secured to one of the trolley poles, preferably that marked 6, by means of a collar 14 having an eye 15 loosely engaging the eye 12 to permit flexibility of action between the bar 10 and the trolley pole 6. A rope 16 is attached to the eye 12 of the thimble 11 at the other end of the bar, and this rope is passed through an eye or a pulley 17, as shown in Fig. 5, and thence down to the car, or preferably to an insulator 19.

From this insulator 19 a rope 20 descends to the rear of the car where it is in easy reach of the conductor thereof, and a rope 22 passes down about a pulley 23 and forward to a point where it can be easily reached by the motorman.

The operation of the trolley is as follows: When two approaching cars come abreast, and consequently when their trolleys are nearly a car-length apart, each motorman reaches to the rope 22 and pulls it until the trolley wheel 3 and its pole 5 have been swung down and inward somewhat more than half the distance between the two wires, as shown in Fig. 2. The motormen can easily know this point by the considerably reduced pull upon their respective ropes, the pull diminishing practically to zero when the wheels become nearly one beneath the other.

To save sparking, the motormen should shut off the power immediately before pulling off their respective trolley, and not switch it on again until after the trolleys have been returned to the wires. The cars being under usual headway, they will drift past each other until their trolleys can no longer meet, and then, by releasing their ropes, the two removed trolleys swing back up into exact engagement with their wires.

Of course, it is necessary to have the trolley wires put up a predetermined distance apart, and to have the bars 10 of the trolleys made of uniform lengths suitably proportioned to bring the grooves of the wheels 3, 4 into correspondence with the trolley wires; but when so made, the return of the removed trolley wheels is always certain.

Whenever it is desired to remove both trolley wheels from their wires, the rope 20 is pulled down upon until not only has the trolley wheel 3 been lowered, but, through the pull imparted through the bar 10, the wheel 4 is also brought down. By proper manipulation of the rope 20, the joined trolleys can be swung to either side of the car to other wires, or fastened down.

For returning the trolleys to the wires, the rope 20 is pulled upon and the trolleys, with the wheel 3 vertically beneath the wheel 4, swung to a point beneath the wire 2. The rope is then gradually released until the wheel 4 engages its wire 2, and then more quickly released until the wheel 3 has swung up into engagement with its wire 1.

It is, therefore, evident that this trolley is of considerable importance even for a line running but a single car and hence not requiring the car-passing function, inasmuch as it reduces the task of applying the two wheels to their wires practically to that of manipulating but a single wheel.

The reason for not coupling the bar directly to the trolley pole 5, but allowing their separation, is that when a car is turned at an oblique angle relative to its overhead trolley wires, the separation of the two wheels is considerably greater than distance between the wires. Hence, by allowing the rope 16 to slip through its eye or pulley 17, the wheels can separate as far as is needed; but as soon as the ropes 20 or 22 are pulled upon, the slack is taken up and the bar 10 put into condition for its desired functions. It is found that the slight obliquity of the trolley poles caused by the ordinary divergence of the passing cars is insufficient to make any appreciable difference in the distance between the wheels 3, 4.

It should be noted that when the trolley pole 5 is swung down and laterally to a point substantially below the pole 6, the upward pressure of the pole 5, acting through the bar 10, is added to the normal upward pressure of the pole 6, and thereby more strongly insures the engagement of the trolley wheel 4 with its wire 2.

What I claim is:

1. In a trolley system provided with two trolley wires, a current collector comprising two current collecting devices each normally in contact with one of said wires, and means operative at will from the car carrying said current collector for withdrawing one of said devices to a substantial distance from its wire and for returning it thereto, the contact of the other device with its wire not being disturbed, the said withdrawal of the device from its wire being sufficient to permit another current collecting device to pass unhindered along the last-mentioned wire, and the unremoved device being an agent in the return of the withdrawn device to its wire.

2. In a trolley system provided with two trolley wires, a current collector comprising two current collecting devices each normally in contact with one of said wires, and means operative at will for withdrawing one of said devices away from its wire toward a point beneath the other device for a distance more than half that between the wires, and for returning it thereto, the contact of the other device with its wire not being disturbed, and the unremoved device being an agent in the return of the withdrawn device to its wire.

3. In a trolley system provided with two trolley wires, a current collector comprising two current collecting devices each embracing a trolley wheel pressed upward into engagement with one of the wires, and means operative at will from the car carrying the current collector for moving one of said devices away from its wire toward the other device for a distance more than half that between the wires, and for returning it thereto, said removing and returning means acting both vertically and laterally, and the removed device being controlled through the unremoved device.

4. In a trolley system provided with two trolley wires, a current collector comprising two grooved trolley wheels, a trolley pole pressing one of said wheels up into engagement with one of said wires, an inflexible upwardly pressed member yieldingly pressing the other of said wheels into engagement with its trolley wire, and means including a rope connected with said member and pole for swinging said member downward and toward said pole to a distance more than half that between said wires without disturbing the engagement with its wire of said pole's trolley wheel, and for swinging said member away from said pole and upward to present its trolley wheel accurately into engagement with the latter's trolley wire.

5. In a trolley system provided with two trolley wires, a current collector comprising two upwardly pressed poles each carrying an under-running trolley wheel, a bar loosely attached at its ends to said poles, and a rope connected with one of said poles, the rope enabling one of the trolley wheels to be withdrawn from its wire, and the bar causing the reëngagement of the same with its wire upon the release of the rope.

6. In a trolley system provided with two trolley wires, a current collector comprising two upwardly pressed poles, each carrying an under-running trolley wheel, a non-conducting bar loosely attached at its ends to said poles, and means for swinging one of said poles downward, said bar causing the reengagement of the removed trolley wheel with its wire when its pole is swung back.

7. In a trolley system provided with two trolley wires, a current collector comprising two upwardly pressed poles each carrying an under-running trolley wheel, a bar attached loosely at one end to one of said poles, the other pole having an eye, and a rope attached to the free end of said bar and passing through said eye to an operative point.

8. In a trolley system provided with two trolley wires, a current collector comprising two upwardly pressed poles each carrying an under-running trolley wheel, a bar attached loosely at its ends to said poles, a pulley held by the car supplied with the current collector, and a rope passing from one of said poles down about said pulley and thence forward into the reach of the motorman.

9. In a trolley system provided with two trolley wires, a current collector comprising two upwardly pressed poles each carrying an under-running trolley wheel, a bar loosely attached at one end to one of said poles, the other pole having an eye, a rope attached to the free end of said bar and passing through said eye, and two ropes connected with the first-named rope, one passing into the reach of the motorman, and the other to the reach of the conductor.

10. In a trolley system provided with two trolley wires, a current collector comprising two current collecting devices, an upwardly pressed pole holding one of said devices into engagement with one of said wires, means for pressing the other device into engagement with its wire, an inflexible member holding said devices apart for a distance corresponding to that between the wires, and a rope connected with one of said devices for its withdrawal.

In testimony that I claim the foregoing invention, I have hereunto set my hand this 27 day of February, 1915.

ARTEMAS B. UPHAM.

Witnesses:
EDWIN SHIVELL,
JOSEPH W. DOWNS.

Copies of this patent may be obtained for five cents each, by addressing the "Commissioner of Patents, Washington, D. C."